United States Patent [19]
Fan

[11] Patent Number: 5,999,892
[45] Date of Patent: Dec. 7, 1999

[54] METHOD FOR PROVIDING AN INSTANT DISTANCE MEASUREMENT ON A MAP

[76] Inventor: Rodric C. Fan, 323 Lower Vintners Cir., Fremont, Calif. 94539

[21] Appl. No.: 08/841,766

[22] Filed: May 5, 1997

[51] Int. Cl.⁶ .................................................... G09F 19/00
[52] U.S. Cl. ........................... 702/158; 701/208; 340/995; 342/357
[58] Field of Search ...................... 364/462, 562, 364/449, 453, 561, 566, 410, 411, 412; 237/32 R, 32 H; 235/105; 342/357, 385, 386; 340/995; 702/158

[56] References Cited

U.S. PATENT DOCUMENTS

| | | | |
|---|---|---|---|
| 5,062,063 | 10/1991 | Atsuko | 364/562 |
| 5,245,537 | 9/1993 | Barber | 364/410 |
| 5,289,167 | 2/1994 | Kurosawai | 340/461 |
| 5,507,485 | 4/1996 | Fisher | 237/32 R |
| 5,528,248 | 6/1996 | Steiner et al. | 342/357 |
| 5,627,547 | 5/1997 | Ramaswamy et al. | 342/357 |
| 5,684,284 | 11/1997 | Lee et al. | 235/105 |

FOREIGN PATENT DOCUMENTS 8-016759  1/1996  Japan ................ G06T 1/00

*Primary Examiner*—John Barlow
*Assistant Examiner*—Kamini S. Shah
*Attorney, Agent, or Firm*—Skjerven, Morrill, MacPherson, Franklin & Friel, LLP; Edward C. Kwok; Glen B. Choi

[57] ABSTRACT

A method and apparatus for providing an instant distance and path information report on an electronic map using linked display lines from a selected point on a map to one or a plurality of preselected position markers on the map. The distance and path information are displayed adjacent to the linked lines. A global position satellite receiving circuit 50 is used to obtain the current position using ranging signals received from satellites 55, 60, and to place a current position marker on the electronic map. A computer processor 35 is utilized to perform distance calculation and to perform coordinate transfer for the electronic display 10. An external interface port 40 allows external input of preselected locations to be displayed on the electronic map. Computer memory 30 is utilized be the computer processor to perform calculations and display processing. In one embodiment, the current position marker is included as one of the preselected position markers. The selected point is selected by an operator utilizing a touch pressure application pen 15 to touch and press on a transparent touch-sensitive screen 5, which is overlaid directly on an electronic display 10, which houses the electronic map. In another embodiment, a link line is displayed on a electronic map to connect between a current position marker to one or a plurality of preselected points to report distance and path information.

21 Claims, 5 Drawing Sheets

METHOD FOR PROVIDING AN INSTANT DISTANCE MEASUREMENT ON A MAP

BACKGROUND

1. Field of Invention

This invention relates to maps, specifically to a machine and method for obtaining instant distance measurement information from a map.

2. Prior Art

The most conventional method of determining or indicating the distance between two points on a printed map is to first measure or estimate the distance in small units (inches or centimeters) between the two points on the map. Then this distance is multiplied by scale factor on the map to obtain the geographical distance. However, this method does not provide an immediate and accurate report of the geographical distance. It is not practical to use this method when an instant distance measurement is required.

U.S. Pat. No. 5,062,063 to Shimizu; Atsuko and Akishima, (1991) shows a length measuring apparatus which is capable of calculating an actual distance by measuring length on a map and which has a display section to display the actual distance thus calculated. A length measuring apparatus is required for measuring length of a path connecting two points on a map. The length measuring apparatus may be a rolling member which rolls along the path. This method requires a user to carry around various maps, a length measuring device, computer storage, and a display. It takes substantial effort, time and much equipment to obtain a single distance measurement using this method. It is not a convenient method to obtain many distance measurements in a short time in a field location.

U.S. Pat. No. 5,289,167 to Kurosawa; Kazuyuki; Shibutani and Atsushi (1994) shows a display apparatus for processing distance information where scale reduction information of the map and time information is analyzed. It also requires a television circuit for displaying a television image on a display. Heavy equipment must be utilized. This is not suitable for obtaining numerous distance measurements in a field location.

Electronic maps pre-loaded in a computer with display unit are used very often in a moving vehicle for navigational purpose. To obtain a geographical distance, one must first enter the selected locations into a processing computer. The selected locations are entered by typing the addresses on a keyboard, or using an electronic mouse to click on the selected points on the map. It is cumbersome and slow to enter the selected points using these methods. It is also not practical to carry around a keyboard or a mouse in a field location for purpose of entering a selected point on a map into a computer.

3. Objects and Advantages

Accordingly, several objects and advantages of the invention are:

a. Easy method to enter a location in a map to obtain distance measurement. New location is entered through a touch pressure application pen pointing directly at the location on a displayed map through a touch-sensitive screen.

b. Clear indication to the operator of the links measured on the map. A linked line is displayed on the map to indicate the distance measured.

c. Quick clearance of the display and to setup for new measurements. The old link and distance display are immediately cleared from the screen when the operator decides to obtain a new measurement.

d. Provides instant distance measurement from a current position marker to any point on a map.

DRAWINGS

SUMMARY OF THE INVENTION

In accordance with the invention, to obtain distance measurement and path information from a selected point to one or a plurality of preselected points on an electronic map, an operator uses a touch pressure application pen to touch the selected point on the electronic map. A transparant touch-sensitive screen is overlaid on the display panel where the electronic map is displayed. The touch-sensitive screen senses the position where touch pressure is applied and generates position coordinate information. A computer processor processes the position coordinate information and maps the touch position coordinate into the electronic display. The computer processor then processes the path information and calculates the distance. It then causes linked lines to be displayed on the display. The linked lines link each preselected position marker to the selected point on the map. Preselected position markers are markers on the electronic map indicating the locations where distances are to be measured from the selected point. Distance measurement and path information relevant to each linked line are processed by the computer processor and displayed immediately adjacent to each linked line. The path information includes road condition or other path relevant information for the specific application. To facilitate operator interaction, linked lines, distances and path information are displayed for operator viewing only during the time touch pressure is applied. The operator can therefore keep the touch pressure on the selected point on the map for as long as the information needs to be displayed. Upon obtaining the distance measurement and path information, the operator can clear the information no longer needed from the display by simply lifting the touch pressure application pen from the display. The operator can then obtain more path information by touching another selected point using the touch pressure application pen. This embodiment allows the obtaining of distance and path information as often as one desires and as quickly as one could utilize. In one embodiment, global positioning satellites (GPS) receiving circuit is used to calculate the current position. A GPS receiving circuit utilizes the range information received from several satellites to triangulate and to calculate the current position. The coordinate of current position obtained by the GPS receiving circuit is mapped on to the electronic map as the preselected points or as one of the preselected points. In another embodiment, distance measurement for one or a plurality of linked lines are displayed on the electronic map. The linked lines link between the current position marker to one or a plurality of preselected points on the electronic map.

DESCRIPTION

Figure 1:
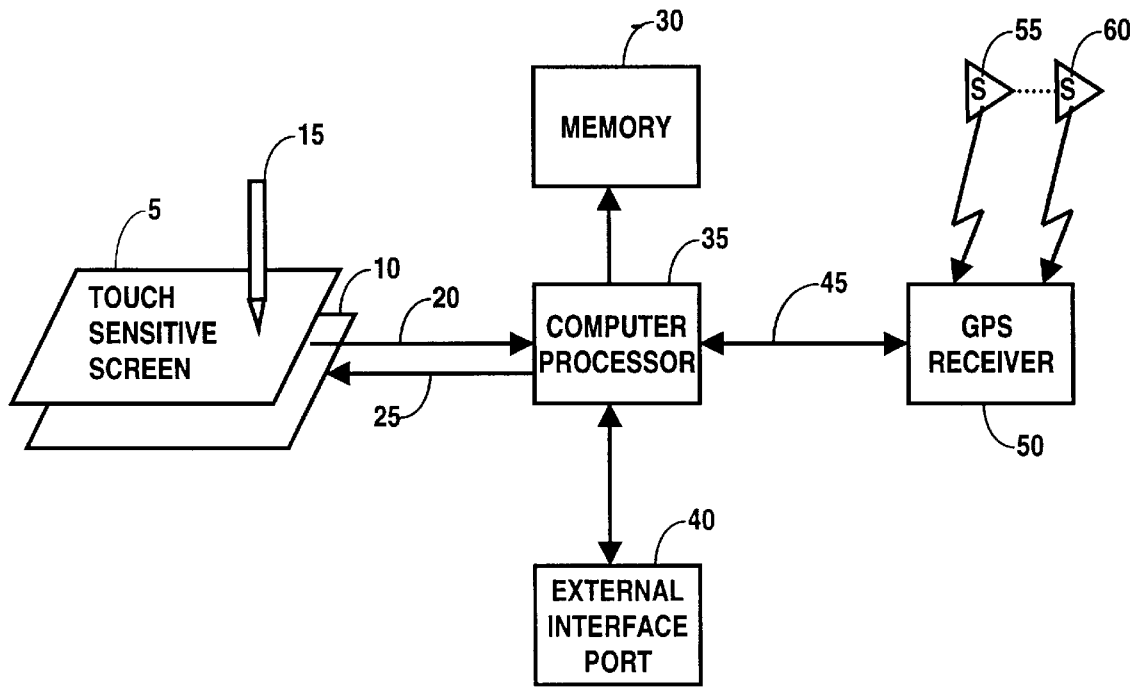
FIG. 1 illustrates a hardware configuration for the main embodiment of a touch screen and map display setup according to the invention.

FIG. 1 Overall System

FIG. 1 illustrates a hardware setup for the main embodiment. A touch-sensitive screen 5 is overlaid on an electronic display panel 10. Touch-sensitive screen is constructed of transparent material with resistive measurement of its coordinate information of the position where touch pressure is sensed. A touch pressure application pen 15, which resembles a writing pen, is used by an operator to apply touch pressure to screen 5. Touch-sensitive screen 5 converts the information of the position on the screen where touch pressure is applied to coordinate information and outputs the coordinate information to a computer processor 35 through an electric connection 20. Computer processor 35 outputs all display information to display panel 10 through line 25. Display information includes, but is not limited to, map, preselected location markers, and path information, etc. Computer processor 35 receives map and path information through an external interface port 40. The computer processor also receives current position information through line 45 from a GPS receiving circuit 50. GPS receiving circuit 50 receives GPS ranging signals from satellites 55 and 60 and utilizes the ranging signals to calculate the current position. GPS receiving circuit 50 outputs the calculated current position to computer processor 35. Computer processor 35 utilizes its memory 30 and its processor to interact between various connecting blocks.

Figure 2:
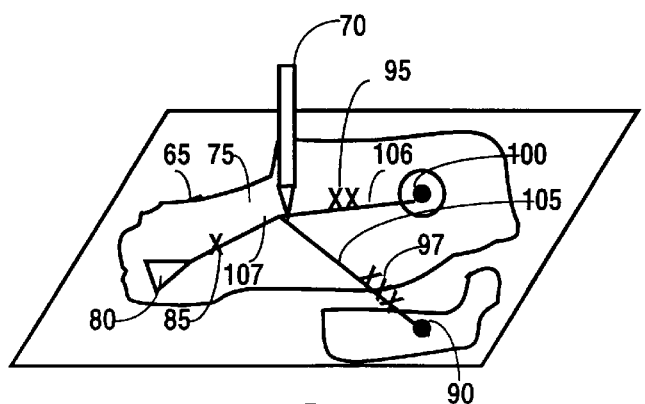
FIG. 2 illustrates a map and display of FIG. 1 where an instant measurement of one or a plurality of straight line geographical distances are to be obtained.

FIG. 2 Map Display of Main Embodiment

FIG. 2 illustrates the map display can provide an instant measurement of one or a plurality of straight-line geographical distances. An area map is processed by computer processor 35 and is displayed on electronic display 10 as an electronic map 65. Distance and path information from preselected points to selected point 75 are obtained through touch pressure applied to point 75, using touch-pressure application pen 70. Linked lines 105, 106, and 107 are displayed on electronic map 65. Distance and path are displayed as text 85, 95 and 97 on electronic map 65 as long as the touch pressure is applied on point 75 of the map. Markers 100, 90, and 80, are preselected points on the map. These points are preselected by the operator for purpose of obtaining distance and path information. Point 80 is preselected in FIG. 2 which is the current position marker processed via GPS receiving circuit 50.

Figure 3:
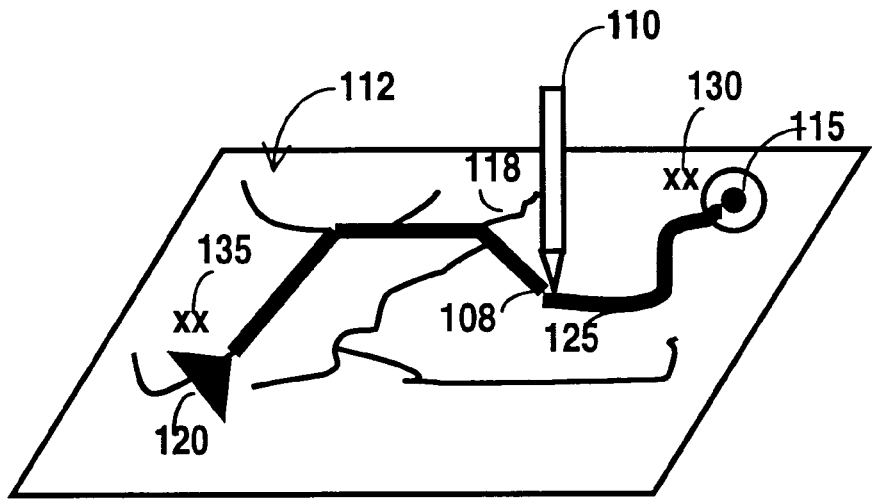
FIG. 3 illustrates a map and display of FIG. 1 where a distance measurement on a road map is obtained.

FIG. 3 Road Distance Measurements On A Map

FIG. 3 illustrates a display where distance measurements on a road map are obtained. A street map 118 is displayed on screen 112. Preselected points include a position marker 120 and a position marker 115. A touch pressure application pen 110 is used to apply touch pressure to a selected point 108 on map 118. Connected link 125 is displayed on the street map following the street route with path information 130 and 135 displayed on the map. Path information is retrieved from database stored in the memory. Path information includes at least one of the following: distance, road condition, pavement, weather etc.

Figure 4:
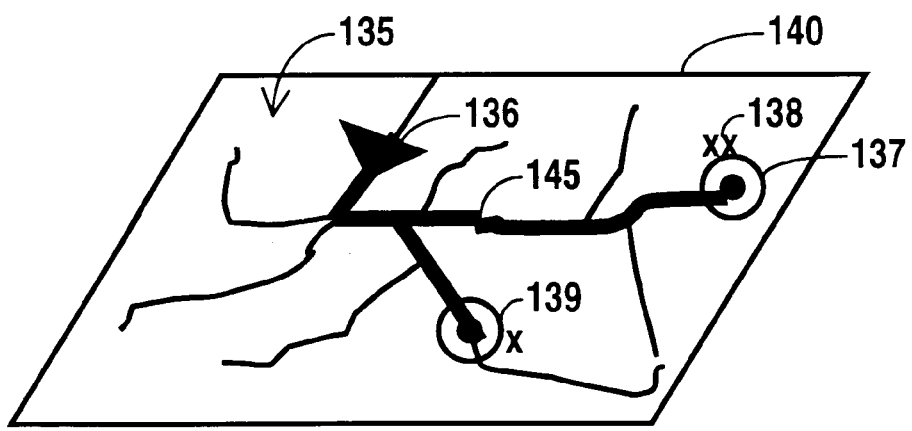
FIG. 4 illustrates a map display of an alternate embodiment where distance measurements from preselected points to a current position are automatically displayed.

FIG. 4 Road Map Display for Alternate Embodiment

FIG. 4 illustrates an alternate embodiment where distances from preselected points to a current position are reported. It displays a connected link 145 between a current position marker 136 to other preselected position markers 137 and 139 on an electronic map on display 135. Path information 140, related to marker 139, and path information 138, related to marker 137, are displayed. One embodiment displays link and path information only during an active period of a control signal. The control signal is either activated by an operator or via remote control input.

Figure 5:
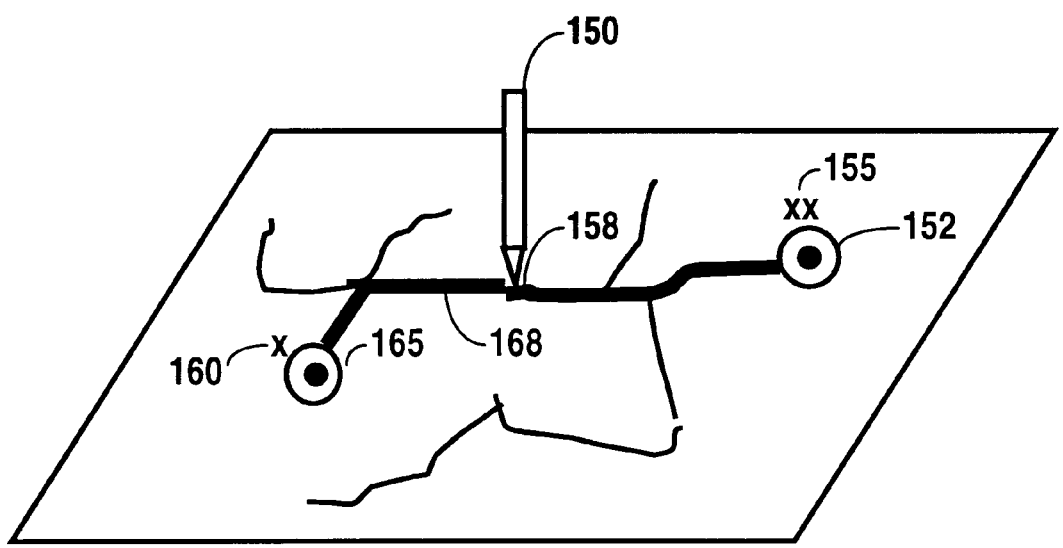
FIG. 5 illustrates a map display of another embodiment where one or a plurality of distance measurements from one or a plurality of preselected points to a selected point on the map are obtained.

FIG. 5 Map Display Without Current Position Marker

FIG. 5 indicates a display screen without a current position marker. Touch-pressure application pen 150 is pointed to a selected point 158 on map display 151. Preselected location markers 152 and 165 are displayed on the display. Display line 168 links marker 152 and 165 to selected point 158. Distance and path information relevant to path link between marker 152 and selected point 158 are displayed as 155. Distance and path information relevant to path link between marker 165 and the selected point 158 are displayed as text 160.

Figure 6:
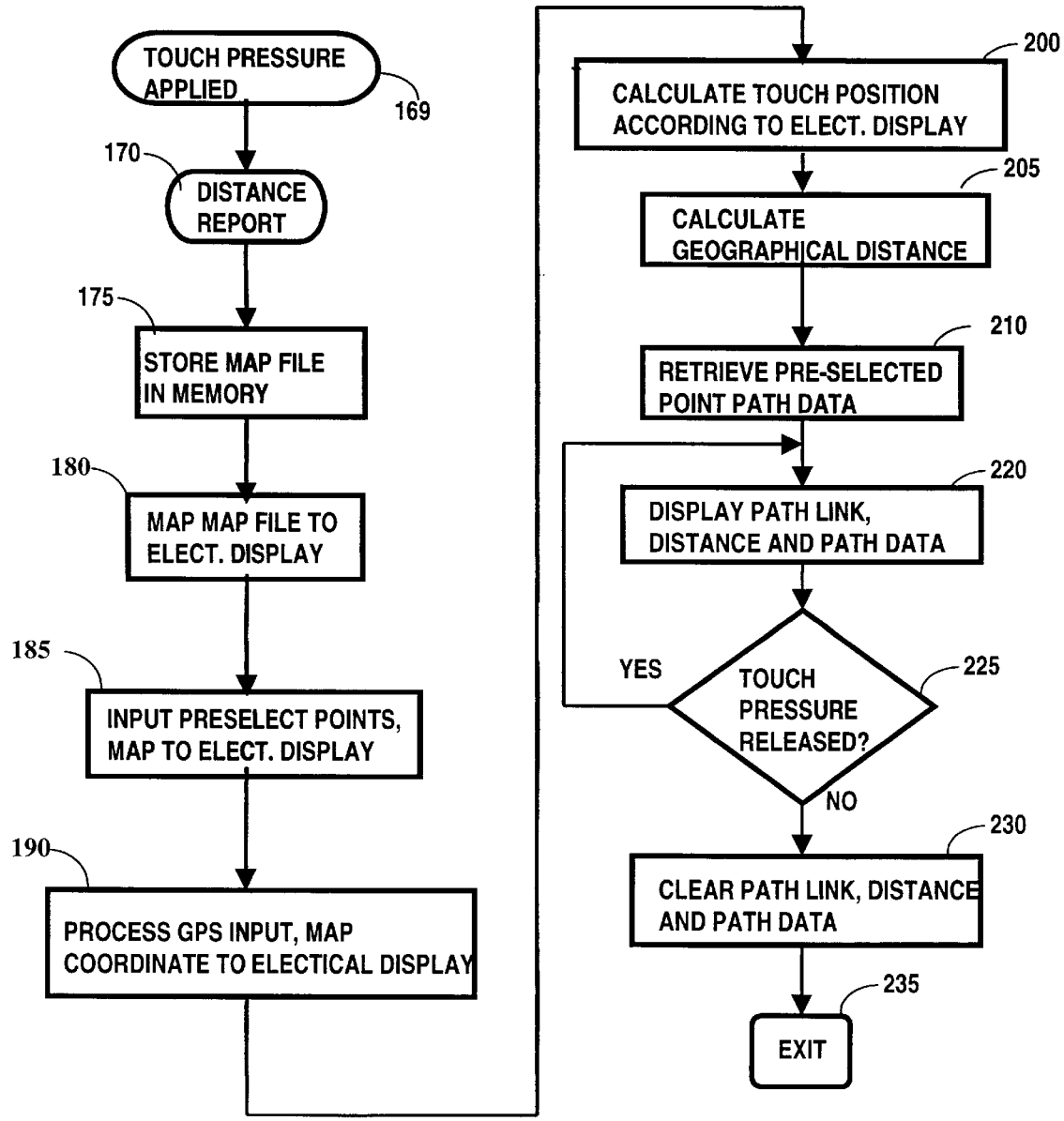
FIG. 6 illustrates a flow chart of the main embodiment indicating how the distance measurement function is implemented.

FIG. 6 Flow Chart of Distance Measurement Function

FIG. 6 is a flow chart showing the distance reporting function of the main embodiment. Distance report program starts at step 170 when touch pressure is applied (step 169). It inputs and stores a map file in computer memory (step 175). Step 180 converts the stored map file to an electronic image and displays an electronic map. Step 185 inputs preselected points and maps the coordinates on the electronic map as preselected location markers. Step 190 processes the GPS input and displays a current position marker on the electronic map. A GPS receiving circuit receives ranging information from several GPS satellites and triangulates this ranging information to calculate the current position. Step 200 calculates the position on the touch-sensitive screen where touch pressure is applied. In step 205, it then calculates geographical distance between preselected points, including the distance from the current position to the point on the screen where touch pressure is applied. In step 210, it retrieves from a database in the memory the relevant distance and path information and displays the distance and path information with the path links in step 220. Step 225 senses if touch pressure is still applied. If the answer is yes, it branches back to step 220 to continue the display. If touch pressure is no longer applied, it proceeds to step 230 to clear the distance and path information together with the path link and exit the routine in step 235.

Figure 7:
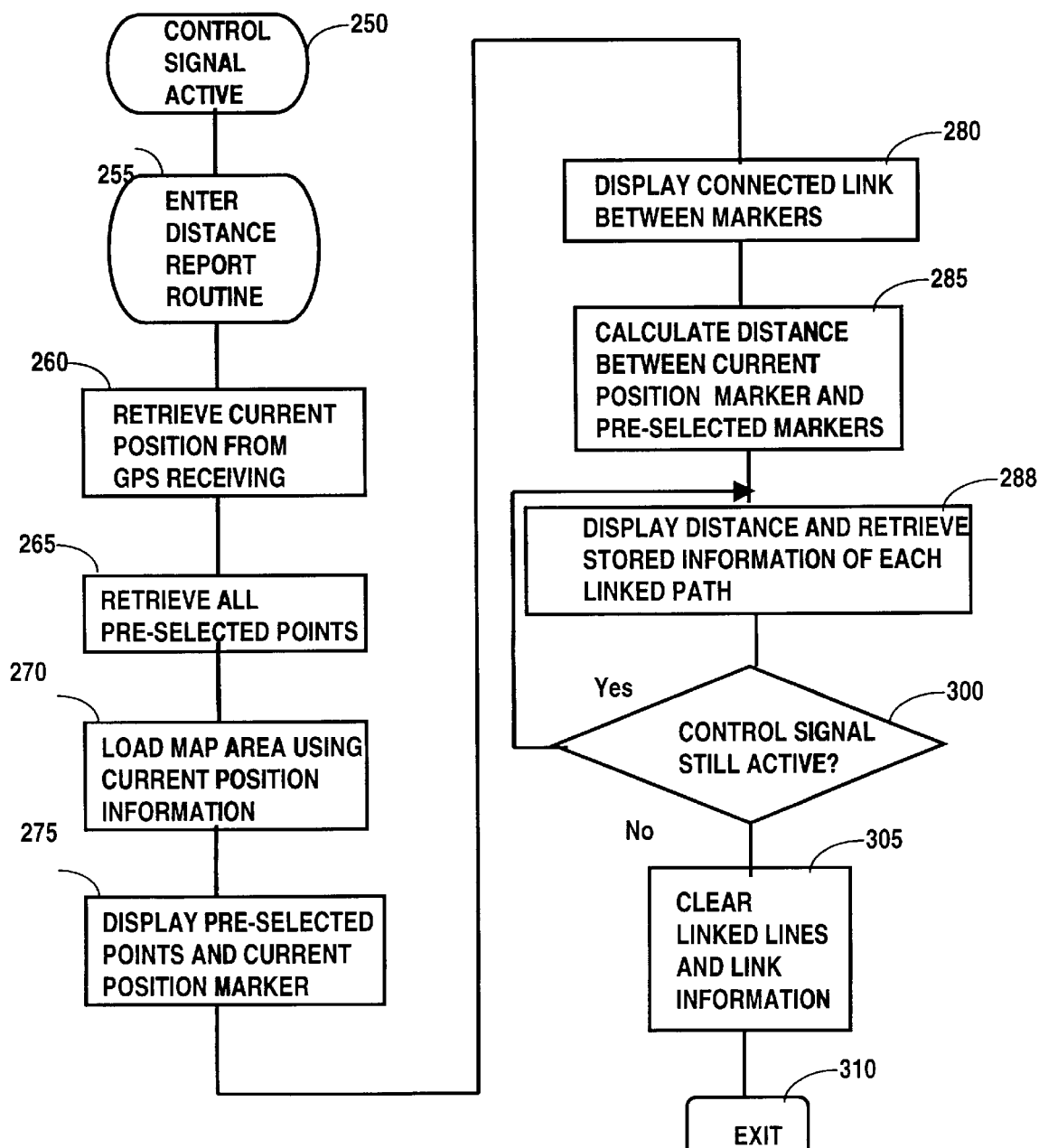
FIG. 7 illustrates a flow chart implementation of the alternate embodiment where distances between a current location to several preselected locations are measured.

FIG. 7 Flow Chart of An Alternate Embodiment

FIG. 7 illustrates a flow chart implementation to report distance between a current position to several preselected points. It reports the distance between the current position to the preselected points. The routine enters at step 255 after it senses the activation of a control signal at step 250. A control signal is generated either from a push-button control armed by an operator, or from an automatic control triggered by predetermined events. Step 260 retrieves the current position from the GPS receiving circuit and step 265 retrieves all preselected points information from the memory. Step 270 uses current position information obtained from step 260 to selectively load and display the current position map which covers the current position. Step 275 displays all preselected point markers and the current position marker on the current position map display. Step 280 displays connected link between markers and step 285 calculates the distances between the current position marker and the preselected point markers. Step 288 displays the distance and retrieves stored information of each linked path. Step 300 checks to see if the control signal is still active. It branches back to step 288 to continue the display if the control signal is still active. It moves to step 305 if the control signal is no longer active. Step 305 clears linked lines and link information and proceeds to exit the routine. Steps 260, 265, 270, and 275 can also be executed in the main program and therefore do not have to be included as part of this routine.

We claim:

1. A machine for providing an instant distance measurement report comprising:
   a. an electrical visual display overlaid with a transparent touch-pressure-sensitive screen;
   b. a touch pressure application pen;
   c. a global position satellite receiving circuit;
   d. a computer processor;
      said computer processor being arranged to cause a map to be displayed as an electronic map on said electrical visual display,
      said global position satellite receiving circuit being arranged to receive satellite ranging information and calculate a current position so that said current position is mapped by said computer processor and displayed as a current position marker on said electronic map,
      said touch pressure application pen being arranged to point at any position on said electronic map through said touch-pressure sensitive screen,
      said touch pressure sensitive screen being arranged to sense the pressure applied by said touch pressure application pen and generate coordinate information where touch pressure is applied,
      said computer processor being arranged to process said coordinate information and cause a linked line to be displayed on said electronic map where said linked line links between said current position marker and where touch pressure is applied,
      said computer processor also being arranged to cause distance information of said linked line to be displayed on said electronic map to report the calculated distance between the map position where pressure is applied and said current position.

2. The machine of claim 1, wherein said linked line on said electronic map is being arranged by said computer processor and displayed as a straight line and said distance is calculated by said computer processor as the direct straight line distance between the linked points on said electronic map.

3. The machine of claim 2, wherein the calculated distance is being arranged by said computer processor to be displayed adjacent to said linked line where distance is to be reported.

4. The machine of claim 2 wherein said linked line and distance report are arranged by said computer processor to be displayed only during the time when touch pressure is applied to said touch-sensitive screen.

5. The machine of claim 2 wherein said current position marker is being arranged by said computer processor to be displayed at fixed time interval repetitively to produce the effect of a flashing marker display.

6. The machine of claim 2 wherein said current position marker is being arranged by said computer processor to be displayed as an arrow to indicate the direction of movement.

7. The machine of claim 2 built in one unit as a hand-held device for suitable for operating in the field.

8. The machine of claim 1, wherein said linked line on said electronic map is being arranged by said computer processor to be displayed as a line, said line follows the route on said electronic map and said computer processor calculates the routing distance following the route and displays said routing distance near said linked line.

9. The machine of claim 8, wherein said computer processor is arranged to display adjacent to said linked line where distance is reported.

10. The machine of claim 8 wherein said linked line and distance report are arranged by said computer processor to be displayed only during the time when touch pressure is applied to said touch-sensitive screen.

11. The machine of claim 8 wherein said current position marker is being arranged by said computer processor to be displayed as an arrow to indicate the direction of movement.

12. The machine of claim 8 wherein said current position marker is being arranged by said computer processor to be displayed at fixed time interval repetitively to produce the effect of a flashing marker display.

13. The machine of claim 8 built in one unit as a hand-held device suitable for operating in the field.

14. A machine for providing a instant distance report comprising:
   a. providing a transparent touch-pressure sensitive screen overlaid on a electrical visual display;
   b. providing a touch-pressure application pen;
   c. providing a computer processor;
      said computer processor being arranged to cause said map to be displayed as an electronic map on said electrical visual display and,
      whereby an operator utilizes said touch pressure application pen to point at any position on said electronic map through said touch pressure sensitive screen and,
      said touch pressure sensitive screen being arranged to sense the pressure applied by said touch pressure application pen and generates coordinate information where touch pressure is applied and,
      said computer processor being arranged to process said coordinate and cause one or a plurality of linked lines linking from said one or plurality of pre-selected points to where touch pressure is applied to be displayed on said electronic map and,
      said computer processor also being arranged to cause the distance information of said one or a plurality of linked lines to be displayed on said electronic map to report the calculated distance between the position on the map where touch pressure is applied and said one or a plurality of pre-selected points.

15. The machine of claim 14, wherein said linked line on said electronic map is being arranged by said computer processor and displayed as a straight line and said distance is calculated by said computer processor as the direct straight line distance between the linked points on said electronic map.

16. The machine of claim 15, wherein the calculated distance is being arranged by said computer processor to be displayed adjacent to said linked line where distance is to be reported.

17. The machine of claim 16 wherein said linked line and distance report are arranged by said computer processor to be displayed only during the time when touch pressure is applied to said touch-sensitive screen.

18. The machine of claim 15 built in one unit as a hand-held device suitable for operating in the field.

19. The machine of claim 14, wherein said linked line on said electronic map is being arranged by said computer processor to be displayed as a line, said line follows the route on said electronic map and said computer processor calculates the routing distance following the route and displays said routing distance near said linked line.

20. The machine of claim 19 wherein said linked line and distance report are arranged by said computer processor to be displayed only during the time when touch pressure is applied to said touch-sensitive screen.

21. The machine of claim 19 built in one unit as a hand-held device for suitable for operating in the field.

* * * * *